United States Patent [19]

Bray

[11] 4,046,685
[45] Sept. 6, 1977

[54] SIMULTANEOUS PRODUCTION OF MULTIPLE GRADES OF PURIFIED WATER BY REVERSE OSMOSIS

[75] Inventor: Donald Thedore Bray, Escondido, Calif.

[73] Assignee: Desalination Systems, Inc., Escondido, Calif.

[21] Appl. No.: 667,842

[22] Filed: Mar. 17, 1976

Related U.S. Application Data

[63] Continuation-in-part of Ser. No. 382,909, July 26, 1973.

[51] Int. Cl.² .................. B01D 13/00; B01D 31/00
[52] U.S. Cl. ...................... 210/23 H; 210/321 R;
 210/493 M; 210/494 M
[58] Field of Search .............. 210/23 H, 321 R, 493, 210/494 M

[56] References Cited

U.S. PATENT DOCUMENTS

| 3,836,457 | 9/1974 | Gross et al. | 210/321 R |
| 3,839,201 | 10/1974 | Miller | 210/23 H |
| 3,846,295 | 11/1974 | Gibbs | 210/321 R |
| 3,887,463 | 6/1975 | Bray | 210/321 R |
| 3,898,158 | 8/1975 | Miller | 210/321 R |

*Primary Examiner*—Frank A. Spear, Jr.
*Assistant Examiner*—Ferris H. Lander
*Attorney, Agent, or Firm*—Clement H. Allen

[57] ABSTRACT

A reverse osmosis apparatus comprises an elongated pressure container housing a plurality of semipermeable membrane cartridges in end-to-end relationship. A separate tap from the product water collector of the semipermeable membrane cartridge or cartridges nearest the inlet of the pressure container for introduction of pressurized feed liquid, produces a high quality water product. A tap from the product water collector of the remainder of the semipermeable cartridges in the pressure container produces a lower quality water product. A minor amount of high quality product water and a major amount of lower quality product water may readily be produced. The process and apparatus may advantageously be employed in the second or subsequent or final step of a multistage process for converting sea water to potable water.

9 Claims, 2 Drawing Figures

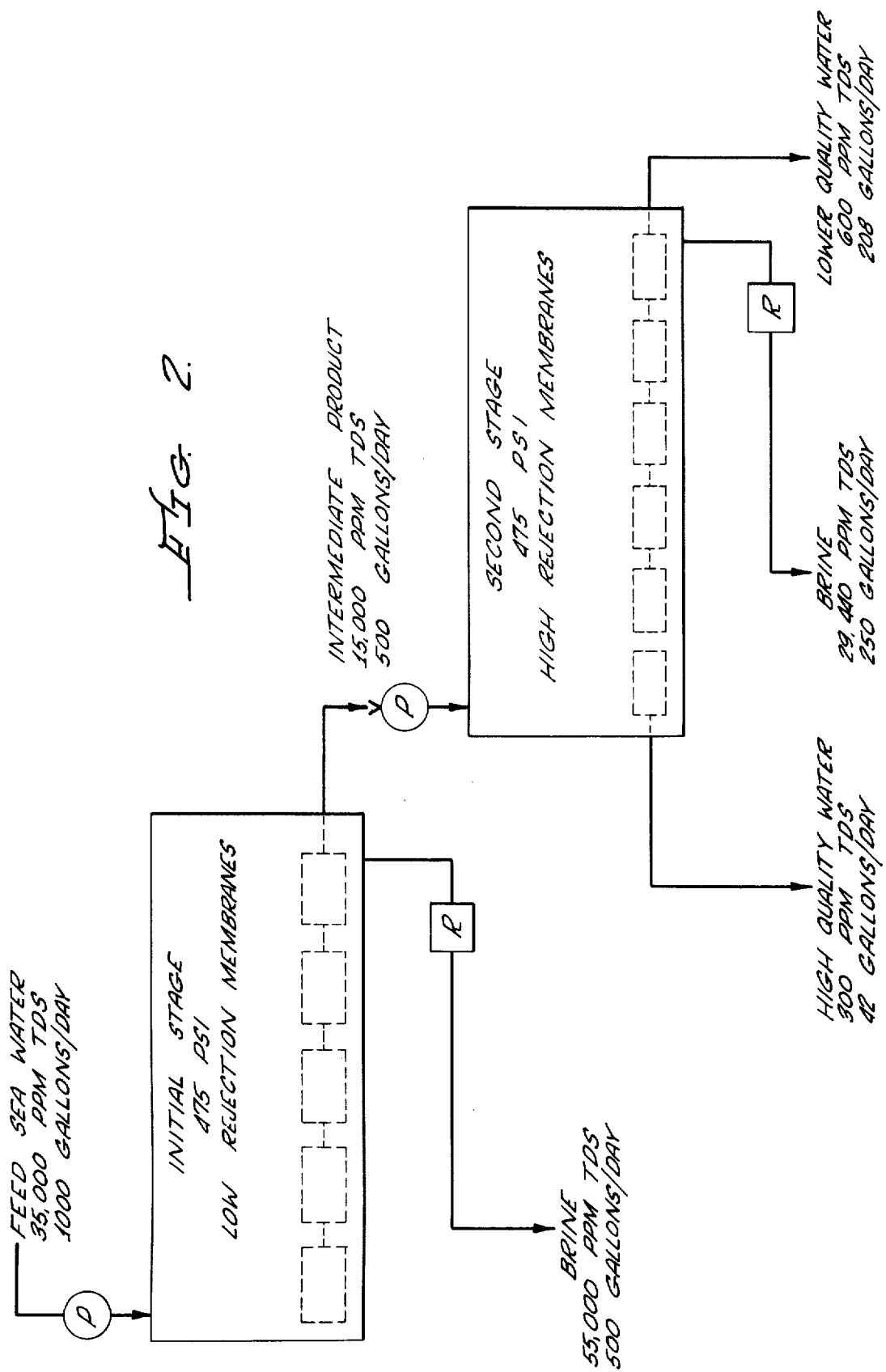

SIMULTANEOUS PRODUCTION OF MULTIPLE GRADES OF PURIFIED WATER BY REVERSE OSMOSIS

CROSS REFERENCE

The application is a continuation-in-part of my copending application Ser. No. 382,909, filed July 26, 1973.

BACKGROUND OF THE INVENTION

1. The Field of the Invention

This invention relates to the production of purified water by reverse osmosis, and more particular, to the simultaneous production of multiple grades of purified water from a unitary reverse osmosis apparatus.

2. The Prior Art

Production of purified water from an impure water source by reverse osmosis is becoming widely known and used. A number of types of impure water may be treated, including sea water, brackish water, river water, municipal supply water, etc. Various types of purified water products may be obtained, including so called "bottled water" grade, which is a high quality purified water used for drinking and cooking, and often containing 300 or less ppm TDS; and lower quality types of purified water, which may contain as high as 500 to 1,000 ppm TSD for municipal supply, or even up to 2,000 or greater ppm TDS for agricultural, stock feeding and industrial purposes. Such products may be produced by individually providing suitable operating conditions such as operating pressure, feed water flow and other conditions, as well as suitable apparatus, including membrane type, for desired salt rejection. Such processes and apparatus have heretofore, however, been designed to produce a single grade of product such as, for example, potable water from sea water, or bottled water grade from municipal supply water. Separate reverse osmosis systems or apparatus can, of course, be designed and used for production of various grades of water products from an impure water source, but this involves considerable expense for providing and operating special and separate apparatus for each different product water type desired. Separate pressure containers housing semipermeable membrane cartridges of specific characteristics and operated at specific water flow and pressure would be required. It is, however, difficult and more expensive to produce a high quality product water such as of bottled water grade from a highly impure feed, such as sea water; and is wasteful if only a small amount of water of this purity is required.

Ordinary and accepted living habits have generated the need for a household water supply consisting of a small amount of high quality water, such as of bottled water grade, for drinking, ice making and cooking, and a larger amount of water of lower quality, adequate, for example, for washing, sanitary purposes and garden watering. Simultaneous production of these two types of water in roughly their required proportional amounts from a single or unitary apparatus would be very advantageous. Industrial water needs often also require different grades of water for specific purposes, and often the purer grade is needed in minor amount.

SUMMARY OF THE INVENTION

Summarized briefly, this invention comprises apparatus and process for purifying an impure feed liquid, such as saline water, by reverse osmosis, in which at least two, and preferably at least three, semipermeable membrane cartridges are housed in end-to-end relationship in a unitary, elongated pressure resistant container, which has a pressurized feed water inlet near one end thereof and a brine outlet near its other end. Impure feed water flows sequentiallly in a single stage through the semipermeable membrane cartridges from the feed inlet to the brine outlet the unpermeated, more concentrated feed water from each cartridge) except of course the last) constituting the feed water for the next cartridge in the sequence and finally exiting as brine. A first product water outlet or tap from the pressure resistant container, to release a high quality purified product water, is connected only to the purified water collector of the semipermeable membrane cartridge or cartridges nearest the feed water inlet of the pressure resistant container. A second product water outlet of tap from the pressure resistant container, to simultaneously release a lower quality purified product water, is connected only to the permeate collector of the remander of the semipermeable membrane cartridges in the pressure resistant container. Provision of at least three semipermeable membrane cartridges in the pressure resistant container can result in a minor amount of high quality product water collected from the semipermeable membrane cartridge or cartridges nearest the feed water inlet of the pressure container, and a major amount of lower quality product water collected from the remainder of the semipermeable membrane cartridges in the pressure resistant container. The process is advantageously employed in a multi-stage process, such as described and claimed in may copending patent application Ser. No. 382,909, filed July 26, 1973, of which this application is a continuation-in-part, and for converting sea water by reverse osmosis in which an intermediate permeate is produced in an initial stage, and a high quality product water and a lower quality product water may be simultaneously produced and separately collected in a subsequent single stage, according to this invention.

BRIEF DESCRIPTION OF THE DRAWINGS

In the drawings:

FIG. 2 shows a flow sheet of a two stage sea water conversion process embodying feature of this invention.

DESCRIPTION OF PREFERRED EMBODIMENTS

Figure 1:
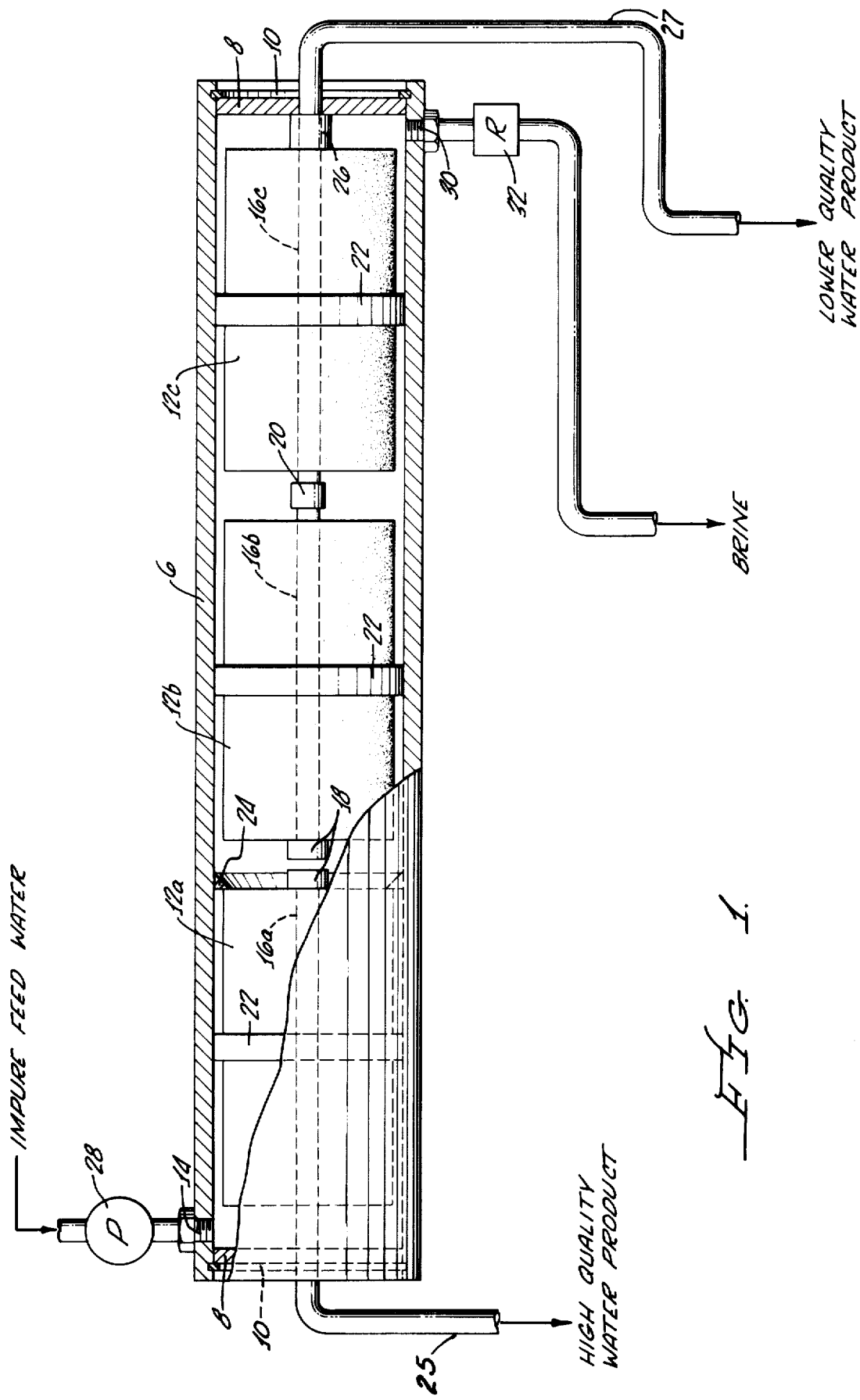
FIG. 1 shows a general view, partly broken out, of apparatus embodying features of this invention.

Referring now to FIG. 1, the apparatus of this invention comprises a unitary, elongated, tubular, pressure resistant container 6, suitably fabricated from metal or high strength plastic and having ends 8 held in place by snap rings 10. Pressure resistant container 6 is unitary in the sense that it constitutes a single housing for the semipermeable membrane cartridges, as distinct from separate pressure resistant containers each producing a differennt grade water product. Pressure resistant container 6 houses three semipermeable membrane cartridges 12a, 12b and 12c, arranged in end-to-end relationship, and being similar in construction, with the cartridge nearest the impure feed water inlet 14 of the pressure resistant container 6 particularly identified as 12a. Semipermeable membrane cartridges 12a, 12b and 12c are of conventional end-to-end flow design and construction, and may be preferably of the so-called spiral wound type such as described in U.S. Pat. Nos.

3,813,334 and 3,542,303, among others. Semipermeable membrane cartridges 12a, 12b and 12c have central purified water or permeate collectors 16a, 16b and 16c, respectively, which extend outwardly at each end of the cartridge proper. The left hand end of purified water collector 16a of semipermeable membrane cartridge 12a passes sealingly through an end wall 8 of pressure resistant container 6 to be connected to high quality product water outlet 25, while its right hand end is capped as shown at 18. The left hand end of collector 16b is also capped in the same manner as 18; its right hand end is sealingly attached to short tube 20, which itself is sealingly attached to the left hand end of collector 16c of semipermeable membrane cartridge 12c, and whose right hand end passes sealingly through the right hand end 8 of pressure container 6. Each of semipermeable membrane cartridges 12a, 12b and 12c is provided with a peripheral seal 22, which prevents feed water from inlet 14 passing over its outside instead of longitudinally through these cartridges in sequence. A ring 24, fastened to the inner wall of pressure resistant container 6, in any convenient manner, maintains semipermeable membrane cartridge 12a in position along the length of pressure resistant container 6, to counteract the effect of the pressre of feed water entering through inlet 14, and it will clearly be seen that no connection exists between the purified water collectors 16a and 16b, and that the high quality water released through a first product water outlet 25 results from connection of product water outlet 25 only with the purified water collector 16a. Spacer tube 26 maintains semipermeable membrane cartridge 12c properly spaced from the right hand end 8 of pressure resistant container 6 to allow free flow of brine from the right hand end of pressure resistant container 6, and since the collector tube 16b of semipermeable membrane cartridge 12b is attached to collector tube 16c, this cartridge is also maintained in proper relation with respect to the adjacent cartridge, and the end of pressure resistant container 6. Purified water collectors 16b and 16c are connected and in communication with each other through short tube 20, and their combined product water output is released through a second product water outlet 27. Thus, the high quality purified water from collector 16a of cartridge 12a, which is nearest feed water inlet 14, is delivered through the first product water outlet 25; and the second product outlet 27 releases low quality purified water from the purified water collectors 16b and 16c of the remainder of the semipermeable membrane cartridges 12b and 12c in pressure resistant container 6. Semipermeable membrane cartridge 12a, that is the cartridge nearest feed inlet 14, may be, but is not necessarily, equipped with membrane of salt rejection characteristics similar to those in cartridges 12b and 12c. This particular cartridge will produce a higher quality product water than produced by cartridges 12b and 12c, even when using identical membranes, because of its proximity to feed water inlet 14. Feed water introduced into pressure resistant container 6 may be pressurized by passage through pump 28; and brine may be released from the end of pressure resistant container 6 opposite that in which inlet 14 is located, through outlet 30, its release being controlled by resistor or back pressure control valve 32, so that operating pressure is maintained in pressure resistant container 6.

In operation of the apparatus of FIG. 1, impure feed water which may, for example, by brackish water containing 5,000 ppm TDS, is pressurized to about 600 psi in pump 28 and introduced through inlet 14 of pressure resistant container 6. This feed water passed longitudinally and sequentially through spiral wound semipermeable membrane cartridges 12a, 12b and 12c, in which purified water permeate transported through the semipermeable membranes is separated and collected as a high quality and a lower quality purified product water. The high quality purified water is collected from semipermeable membrane cartridge 12a, which is the cartridge nearest feed water inlet 14 of pressure resistant container 6, through the projecting left hand end (in FIG. 1) of its purified water collector 16a, and delivered from outlet 25. The lower quality product water is collected from cartridges 12b and 12c through purified water collector 16c and outlet 27. Brine exiting from cartridge 12c is released from outlet 30 through back pressure control valve resistor 32 and led to drain or disposal. Cartridge 12a may be equipped with membranes of 95% salt rejection (tested using 100 NaCl solution feed at 100 psi) and cartridges 12b and 12c membranes of about 85% salt rejection (tested in like manner). High quality product water may be of about 150 ppm TDS, while the lower quality product water may be of about 500 ppm TDS quality. If the cartridges 12a, 12b and 12c are of the same size and of approximately the same output capacity, a minor amount of high quality product water will be produced by the single cartridge 12a, and a major amount of lower quality product water will be produced from the remaining two cartridges, 12b and 12c. Thus, to product a minor amount that is less than 50% of the total, of high quality product water, less than one-half the total number of cartridges in the pressure resistant container are preferably connected to the high quality product outlet 25, and the remainder are connected to lower quality product water outlet 27 to product a major amount of this grade product.

Referring now to FIG. 2, a flow sheet is shown for a two stage reverse osmosis process for simultaneous production from sea water of a minor amount (about 16%) of a high quality product water similar to bottled water, useful for drinking and cooking; and a major amount (about 84%) of a lower quality product water, similar to municipal water of relatively poor grade, useful for washing, sanitary purposes and garden watering. The general process follows that described and claimed in my aforementioned copending patent application, Ser. No. 382,909, filed July 26, 1973. For illustrative purposes, the membrane cartridges in each stage will be considered of similar characteristics.

The following example of the process of this invention follows the flow sheet shown in FIG. 2.

EXAMPLE

A sea water feed containing about 35,000 ppm TDS is introduced at a rate of 100 gallons per day into a high pressure pump, and its pressure raised to about 500 psi. The pressurized feed in introduced into one end of a pressure resistant container housing several semipermeable membrane cartridges, having their product water collectors connected in series and having semipermeable membranes characterized by a salt rejection of 60%, tested at 100 psi pressure using 1,000 NaCl solution. The intermediate permeate from this initial stage contains 15,000 ppm TDS and amounts to 500 gallons per day. The brine, which is released from the end of the pressure resistant container remote from the feed inlet end, contains 55,000 ppm TDS and amounts to 500 gallons per day. The brine is released through a back pressure control valve R, which maintains operating pressure of 475 psi in the pressure resistant container.

The intermediate permeate from the initial stage is released at atmospheric pressure and may, if desired, be temporarily stored in a surge tank, not shown, and is introduced into another high pressure pump and its pressure raised again to about 500 psi. This pressurized intermediate product water is introduced into one end of a single or unitary pressure resistant container housing six semipermeable membrane cartridges, arranged in end-to-end relationship, and through which the intermediate product water flows sequentially. The semipermeable membranes are characterized by a salt rejection of 95% tested at 100 psi using a 1,000 ppm TDS feed solution. The permeate collector of the semipermeable membrane cartridge nearest the inlet for the intermediate product water feed in connected only to a high quality product water outlet and produces about 42 gallons per day of product water containing 300 ppm TDS. The remainder, that is the other semipermeable membrane cartridges in the pressure resistant container, have their permeate collectors connected in series and connected to a lower quality product water outlet, which produces about 208 gallons per day of water containing 600 ppm TDS. The brine, which is released from the end of the pressure resistant container remote from the intermediate product water feed inlet end, contains 29,400 ppm TDS and amounts to 500 gallons per day. The brine is released through a back pressure control valve R, which maintains an operating pressure of 475 psi in the pressure resistant container. Thus, the process produces a minor amount of high quality water of 300 ppm TDS and a major amount of lower quality water of twice this salt content, or 600 ppm TDS.

It will be appreciated that the number of cartridges, located nearest the feed inlet end of the pressure resistant container and whose purified water collectors are connected, will determine the proportion of high quality water produced; and the number should be less than 50% of the total number to produce a minor proportion, since the cartridges nearest the feed water inlet will ordinarily produce slightly higher product water output than those sequentially further down the line due to their treatment of lower solids content impure water. Thus, for example, a pressure resistant container may house as many as 8 to 10 cartridges arranged end-to-end, and the purified water from the inlet end cartridge alone, or the two or even three or four, inlet end cartridges, may be utilized for high quality water output with the high quality water proportion varying roughly from about one-tenth to somewhat less than one-half. Although generally a lower proportion of high quality water will be desired, the invention includes arrangement so that a larger proportion of high grade water may be produced, if desired, by collecting product water from a majority of the cartridges, these being nearest the feed inlet end.

While the apparatus and process of this invention have been more particularly described for producing a high quality and a lower quality product water for household, or perhaps hotel use, they may be advantageously used for industrial purposes. For example, an electronics equipment plant may need to produce a very pure water for further purification by deionization for washing circuit boards, and a larger amount of relatively lower quality water for general plant use. In the production of potable water from sea water for industrial and agricultural, as well as municipal use, the ability to produce two grades of water from the same purification unit will be a tremendous advantage, since one type of water can be allocated for industrial, agricultural and stock feeding use, and another type for municipal use without expense for additional plant construction and with outputs and qualities regulated for the needed requirements. Thus, a large amount of water in the range of 1,000 to 2,000 ppm TDS will be economic and desirable for agricultural purposes and stock feeding, while a smaller amount containing from 500 to 1,000 ppm TDS will constitute a municipal supply grade. The water grades will thus range from a very good potable grade, as low as 500 ppm TDS, to a lower quality, but still potable grade in the broad sense, acceptable for stock feeding. This is much less expensive than being required to produce a large output at a purity level of municipal water in order to satisfy a minor production requirement of this or better purity. Or, for a reverse osmosis unit on board an oil tanker, a high quality water may be produced for crew subsistence, and a lower quality (but still broadly termed fresh) water produced for empty tank flushing to minimize corrosion.

The efficiency of the apparatus and process of this invention stems from the fact that the semipermeable membrane cartridge nearest the feed water inlet of the pressure resistant container is treating impure water of the original feed total dissolved solids content. The following cartridges in line, however, are sequentially treating water containing not only the feed water level of impurities, but in addition, the impurities separated from the purified water produced by the cartridge or cartridges ahead of it. Thus, the initial cartridge or cartridges can produce a better grade water because it or they will be treating a less contaminated feed than the following cartridges in sequence, even if the membranes are of identical type in all cartridges. Additionally, the inlet feed water flow is always greater than the brine outlet flow, due to the separation of purified product water. Therefore, the feed water stream moves with higher velocity through the cartridges nearest the feed water inlet of the pressure resistant container. This higher velocity reduces the boundary layer build-up at the membrane surfaces and results in a purer separated purified water than from cartridges (of similar type) further down the line toward the brine outlet end.

It is at times advantageous to employ the same type of membranes in all the cartridges in the pressure resistant container when the required purity high quality water can be produced in desired amount. This obviates maintaining spares and replacement cartridges of different membrane types. It is a unique feature of this invention that more than one grade of purified product water may be obtained from a unitary pressure resistant container housing a plurality of semipermeable membrane cartridges, all using the same type of membrane.

It will be understood that the purified water produced by the semipermeable membrane cartridges, as described, will be the permeate transported through the semipermeable membranes and collected to produce either high quality or lower quality product water according to this invention.

It will be appreciated that in the method illustrated by reference to FIG. 2 and described in Example 1, operating pressures of about 475 psi have been employed in both initial and second stages. Although higher pressures, such as up to 600 psi, or higher if desired, may be employed, employment of low pressures, that is from about 300 psi to about 500 psi, are preferred for operating economy and to permit use of lower strength materials of construction, all as described in afore-mentioned Application Ser. No. 382,909.

I claim:
1. Reverse osmosis apparatus comprising a unitary elongated pressure resistant container housing a plurality of semipermeable membrane cartridges, said pressure resistant container having an impure feed water inlet near one of its ends, a brine outlet near the other of its ends, and a product water outlet communicating with a permeate collector for said semipermeable membrane cartridges; in which the improvement comprises:
   a. said pressure resistant container housing at least two of said semipermeable membrane cartridges, arranged in end-to-end relationship, and through which said impure feed water flows sequentially, in a single stage, the unpermeated feed water from each cartridge constituting the feed water for the next cartridge in the sequence;
   b. a first product water outlet from said pressure resistant container, to provide an amount of high quality, low total dissolved solids content product water, connected only to the permeate collector of at least one of said semipermeable membrane cartridges located nearest the impure feed water inlet of said pressure resistant container; and
   c. a second product water outlet from said pressure resistant container, to simultaneously provide an amount of lower quality, higher total dissolved solids content product water, connected only to the permeate collector of the remainder of said semipermeable membrane cartridges in said pressure resistant container.

2. Reverse osmosis apparatus according to claim 1, in which said first product water outlet from said pressure resistant container is connected only to the permeate collector of the said semipermeable membrane cartridge located nearest the said impure feed water inlet of said pressure resistant container, and said second product water outlet from said pressure resistant container is connected only to the permeate collector of the remainder of the said semipermeable membrane cartridges in said pressure resistant container.

3. Reverse osmosis apparatus according to claim 1, in which said pressure resistant container houses at least three of said semipermeable membrane cartridges in end-to-end relationship, and the number of said cartridges whose said permeate collector is connected to said first product water outlet of said pressure resistant container in less than one-half the number of said cartridges whose said permeate collector is connected to said second product water outlet of said pressure resistant container, thereby to release a minor amount of high quality product water from said first product water outlet of said pressure resistant container and a major amount of lower quality product water from the said second purified water outlet of said pressure resistant container.

4. A process for simultaneously separately producing high quality product water and lower quality product water by reverse osmosis treatment of impure water under elevated pressure in a unitary elongated pressure resistant container housing at least two semipermeable membrane cartridges arranged in end-to-end relationship, and having an impure feed water inlet near one end and a brine outlet near the other of its ends; which comprises:
   a. flowing said impure feed water sequentially in a single stage through the said semipermeable membrane cartridges so that the unpermeated feed water from each cartridge constitutes the feed water for the next cartridge in the sequence;
   b. separately collecting and releasing high quality low total dissolved solids content product water as permeate from at least one of the said semipermeable membrane cartridges nearest the feed water inlet of said pressure resistant container; and
   c. separately collecting and releasing lower quality higher total dissolved solids content product water as permeate from the remainder of said semipermeable membrane cartridges in said pressure resistant container.

5. A process according to claim 4, in which said high quality product water is separately collected from the said semipermeable membrane cartridge nearest the feed water inlet of said pressre resistant container, and said lower quality product water is separately collected from the remainder of said semipermeable membrane cartridges in said pressure resistant container.

6. A multi-stage reverse osmosis process for simultaneously producing an amount of high grade product water and an amount of lower quality product water from a saline feed solution containing from 28,000 to 40,000 ppm TDS comprising:
   a. in an initial stage reducing the salinity of the said feed solution by reverse osmosis to produce an intermediate permeate containing from one-fourth to one-half the salt content of the original feed solution employing an operating pressure of between about 300 and about 500 psi and a semipermeable membrane characterized by a salt rejection of between 40 and 70 percent when tested at 100 psi using a 1,000 ppm NaCl feed solution;
   b. in a subsequent stage reducing the salinity of said intermediate permeate from said initial stage in a unitary, elongated pressure resistant container housing at least two semipermeable membrane cartridges in end-to-end relationship, employing an operating pressure of between about 300 and about 500 psi and semipermeable membranes characterized by a salt rejection of more than 90% when tested at 100 psi using a 1,000 ppm NaCl feed solution by flowing said intermediate permeate sequentially through said cartridges, the unpermeated feed water from each cartridge constituting the feed water from the next cartridge in the sequence;
   c. separately collecting and releasing high quality product water as permeate from at least one of the said subsequent stage semipermeable membrane cartridge nearest the intermediate permeate feed inlet of said pressure resistant container; and
   d. separately collecting and releasing lower quality product water as permeate from the remainder of said subsequent stage semipermeable membrane cartridges in said pressure resistant container.

7. A process according to claim 6, in which the said pressure resistant container houses at least three semipermeable membrane cartridges in end-to-end relationship to simultaneously produce a minor amount of high quality product water and a major amount of lower quality product water.

8. A process according to claim 7, in which said minor amount of high quality product water contains up to about 300 ppm TDS, and said major amount of lower quality product water contains up to 2,000 ppm TDS.

9. A process according to claim 8, in which said minor amount of high quality product water contains about 300 ppm TDS and said major amount of lower quality product water contains about 600 ppm TDS.

* * * * *